United States Patent
Adusumalli et al.

(10) Patent No.: US 11,928,789 B2
(45) Date of Patent: Mar. 12, 2024

(54) VEHICLE VISION SYSTEM

(71) Applicant: ZF FRIEDRICHSHAFEN AG, Friedrichshafen (DE)

(72) Inventors: Venkateswara Adusumalli, New Hudson, MI (US); Robert Berg, Ann Arbor, MI (US); Santanu Panja, Commerce Township, MI (US); James Oldiges, Farmington Hills, MI (US); Sriharsha Yeluri, Farmington Hills, MI (US); Radha Sivaraman, Troy, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 464 days.

(21) Appl. No.: 16/720,053

(22) Filed: Dec. 19, 2019

(65) Prior Publication Data

US 2021/0192257 A1 Jun. 24, 2021

(51) Int. Cl.
*G06T 3/40* (2006.01)
*G06V 10/25* (2022.01)
*G06V 10/46* (2022.01)
*G06V 20/59* (2022.01)

(52) U.S. Cl.
CPC ............ *G06T 3/4038* (2013.01); *G06V 10/25* (2022.01); *G06V 10/462* (2022.01); *G06V 20/59* (2022.01)

(58) Field of Classification Search
CPC .......................... G06K 9/3233; G06K 9/00832
USPC ......................................................... 382/282
See application file for complete search history.

(56) References Cited

U.S. PATENT DOCUMENTS

| | | | |
|---|---|---|---|
| 6,625,315 B2 | 9/2003 | Laumeyer et al. | |
| 6,792,339 B2 | 9/2004 | Basson et al. | |
| 8,405,731 B2 | 3/2013 | Nilsson | |
| 9,205,835 B2 | 12/2015 | Stein et al. | |
| 9,847,004 B1 | 12/2017 | Lan et al. | |
| 10,115,029 B1 | 10/2018 | Day et al. | |
| 2005/0275723 A1* | 12/2005 | Sablak | G06T 7/194 |
| | | | 348/169 |
| 2009/0066065 A1 | 3/2009 | Breed et al. | |
| 2016/0272114 A1 | 9/2016 | Medina | |
| 2017/0240022 A1 | 8/2017 | Ireri | |
| 2018/0272977 A1 | 9/2018 | Szawarski et al. | |
| 2018/0276874 A1* | 9/2018 | Myhill | G06T 15/20 |

(Continued)

FOREIGN PATENT DOCUMENTS

| | | |
|---|---|---|
| EP | 2164043 A1 | 3/2010 |
| WO | 2006099172 A1 | 9/2006 |

OTHER PUBLICATIONS

Naser et al., Infrastructure-free NLoS Obstacle Detection for Autonomous Cars, Nov. 2019, IEEE (Year: 2019).*

(Continued)

*Primary Examiner* — Wednel Cadeau
(74) *Attorney, Agent, or Firm* — TAROLLI, SUNDHEIM, COVELL & TUMMINO L.L.P.

(57) ABSTRACT

A method of processing an image within a vehicle interior with a camera includes acquiring a live image of the vehicle interior. The live image is compared to an ideally aligned image of the vehicle interior having an associated region of interest to generate a homography matrix. The homography matrix is applied to the region of interest to generate a calibrated region of interest projected onto the live image for detecting an object therein.

6 Claims, 8 Drawing Sheets

(56) References Cited

U.S. PATENT DOCUMENTS

| | | |
|---|---|---|
| 2019/0057596 A1 | 2/2019 | Desai |
| 2019/0206084 A1 | 7/2019 | Noble et al. |
| 2019/0251818 A1 | 8/2019 | Nagatomi et al. |
| 2019/0303686 A1 | 10/2019 | Guo et al. |
| 2020/0012871 A1* | 1/2020 | Lee ............... B60N 2/0224 |
| 2021/0127204 A1 | 4/2021 | Porta |

OTHER PUBLICATIONS

Andrey et al "Car-Seat Occupancy Detection Using a Monocular 360° NIR Camera & Advanced Template Matchiing"—2009 16th International Conference on Digital Signal Processing IEEE 2009.

Censi et al "Image Stabilization by Features Tracking" Proceedings 10th International Conference on Image Analysis & Processing—IEEE 1999.

Karami et al "Image Matching Using SIFT, SURF, BRIEF & ORB: Performance Comparison for Distorted Images" In: arXiv preprint arXiv:1710.02726, 2017. (URL: https://arxiv.org/pdf/1710.02726 ).

Miksch et al "Automatic Extrinsic Camera Self-Calibration Based on Homography & Epipolar Geometry", In: Workshop on Intelligent Transportation, 2010, pp. 17-22. Inhaltsgleiche Version online abrufbar Ober URL: https://www.iss.uni-stuttgart.de/forschung/publikationen/miksch_wit201 O.pdf.

Miksch et al "Homography-Based Extrinsic Self-Calibration for Cameras in Automotive Applications", n: 2010 IEEE Intelligent Vehicles Symposium. IEEE, 2010. S. 832-839. doi:10.1109/IVS.2010.5548048.

* cited by examiner

VEHICLE VISION SYSTEM

TECHNICAL FIELD

The present invention relates generally to vehicle assist systems, and specifically to a vision system for a vehicle interior.

BACKGROUND

Current driver assistance systems (ADAS—advanced driver assistance system) offer a series of monitoring functions in vehicles. In particular, the ADAS can monitor the environment within the vehicle and notify the driver of the vehicle of conditions therein. To this end, the ADAS can capture images of the vehicle interior and digitally process the images to extract information. The vehicle can perform one or more functions in response to the extracted information.

SUMMARY

In one example, a method of processing an image within a vehicle interior with a camera includes acquiring a live image of the vehicle interior. The live image is compared to an ideally aligned image of the vehicle interior having an associated region of interest to generate a homography matrix. The homography matrix is applied to the region of interest to generate a calibrated region of interest projected onto the live image for detecting an object therein.

In another example, a method of processing an image within a vehicle interior with a camera includes acquiring a live image of the vehicle interior. The live image is compared to an ideally aligned image of the vehicle interior having an associated region of interest by generating and comparing keypoints between each of the live image and the ideally aligned image. A homography matrix is generated based on the comparison between the live image and the ideally aligned image. The region of interest is transformed by applying the homography matrix thereto to generate a calibrated region of interest projected onto the live image for detecting an object therein and ignoring objects detected outside the calibrated region of interest.

In another example, a method of adjusting a camera within a vehicle interior includes acquiring a live image of the vehicle interior and comparing the live image to an ideally aligned image of the vehicle interior to generate a homography matrix. Differences between the live image and the ideally aligned image are determined in at least one degree of freedom from the homography matrix. At least one of a position and orientation of the camera is adjusted based on the at least one degree of freedom difference.

Other objects and advantages and a fuller understanding of the invention will be had from the following detailed description and the accompanying drawings.

DETAILED DESCRIPTION

Figure 1A:
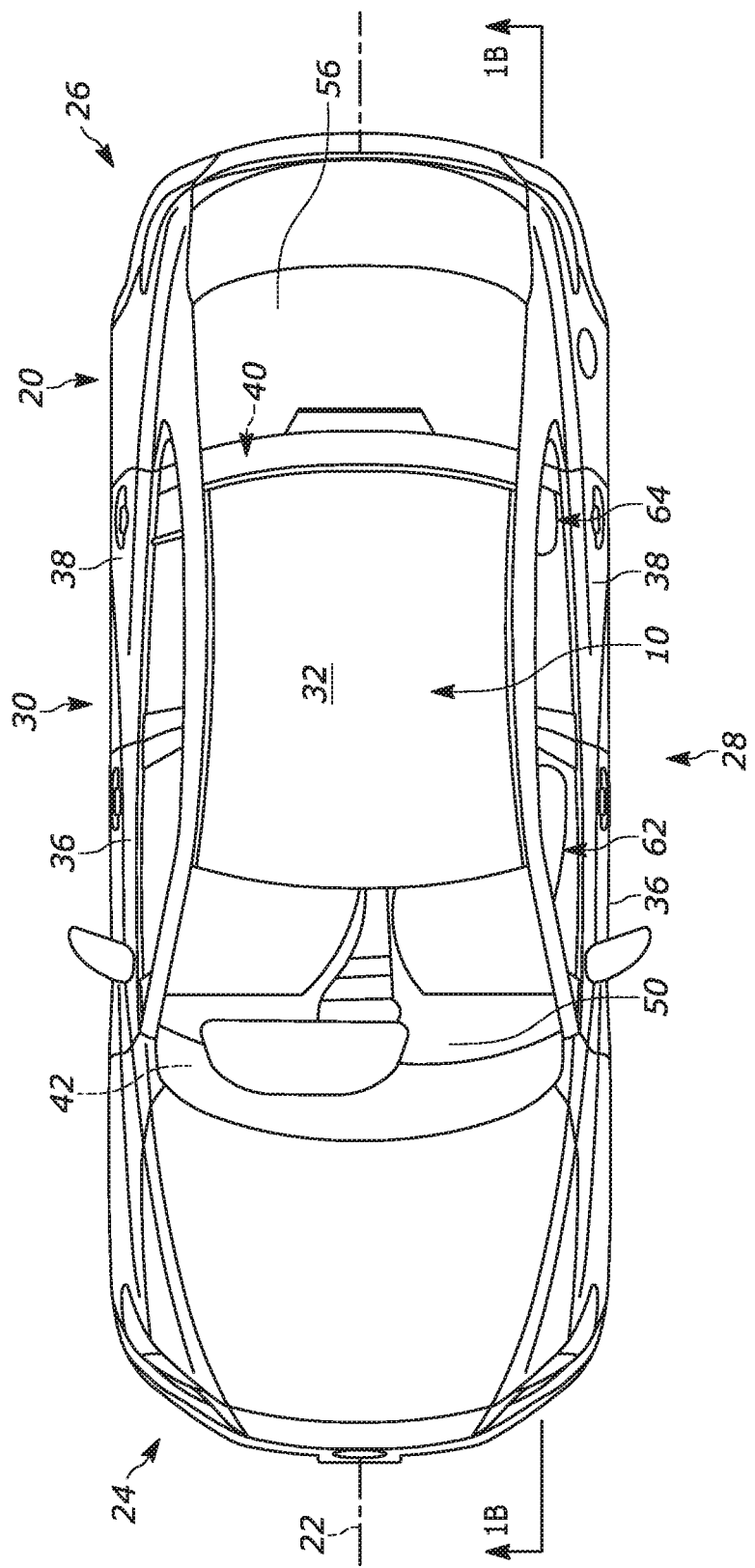
FIG. 1A is a top view of a vehicle including an example vision system in accordance with the present invention.
Figure 1B:
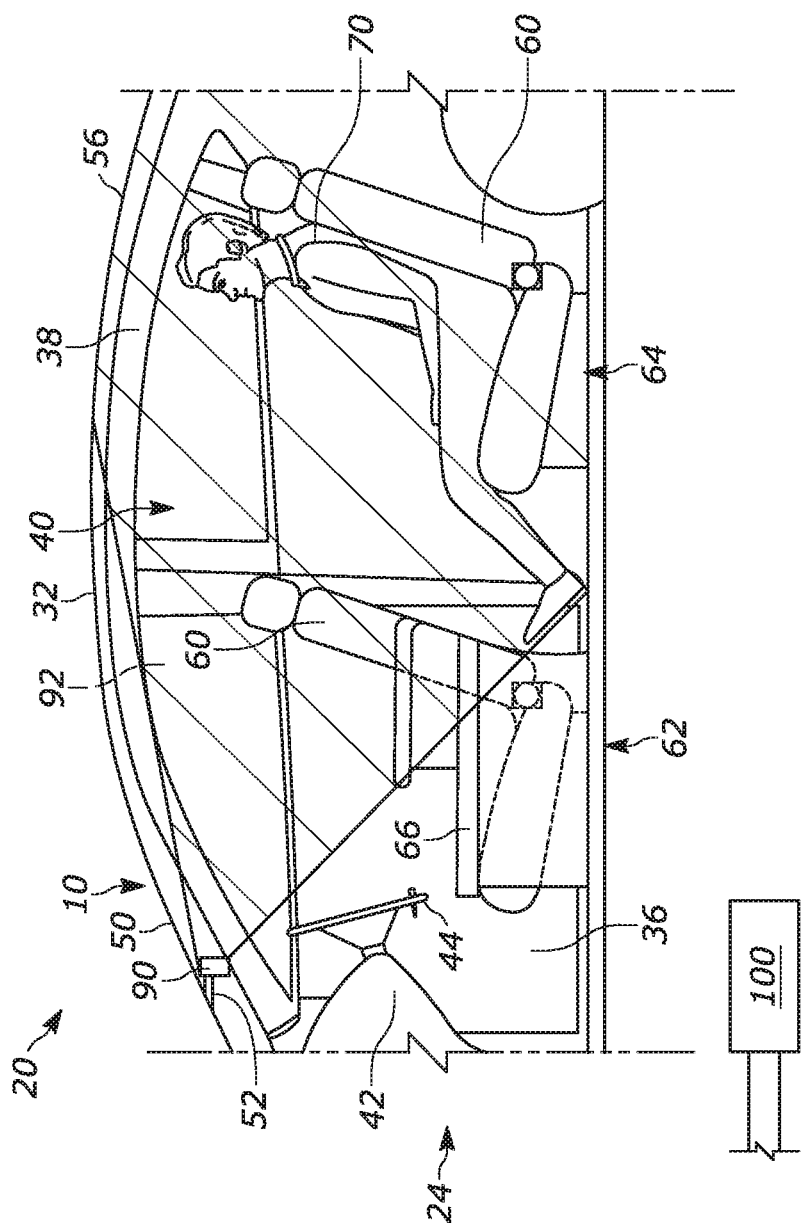
FIG. 1B is a section view taken along line 1B-1B of the vehicle of FIG. 1A.

The present invention relates generally to vehicle assist systems, and specifically to a vision system for a vehicle interior. FIGS. 1A-1B illustrate a vehicle 20 having an example vehicle assist system in the form of a vision system 10 for acquiring and processing images within the vehicle. The vehicle 20 extends along a centerline 22 from a first or front end 24 to a second or rear end 26. The vehicle 20 extends to a left side 28 and a right side 30 on opposite sides of the centerline 22. Front and rear doors 36, 38 are provided on both sides 28, 30. The vehicle 20 includes a roof 32 that cooperates with the front and rear doors 36, 38 on each side 28, 30 to define a passenger cabin or interior 40.

The front end 24 of the vehicle 20 includes an instrument panel 42 facing the interior 40. A steering wheel 44 extends from the instrument panel 42. Alternatively, the steering wheel 44 can be omitted (not shown) if the vehicle 20 is an autonomous vehicle. Regardless, a windshield or windscreen 50 is located between the instrument panel 42 and the roof 32. A rear view mirror 52 is connected to the interior of the windshield 50. A rear window 56 at the rear end 26 of the vehicle 20 helps close the interior 40.

Seats 60 are positioned in the interior 40 for receiving one or more occupants 70. In one example, the seats 60 can be arranged in front and rear rows 62 and 64, respectively, oriented in a forward-facing manner. In an autonomous vehicle configuration (not shown), the front row 62 can be rearward facing. A center console 66 is positioned between the seats 60 in the front row 62.

The vision system 10 includes at least one camera 90 positioned within the vehicle 20 for acquiring images of the interior 40. As shown, a camera 90 is connected to the rear view mirror 52, although other locations, e.g., the roof 32, rear window 56, etc., are contemplated. In any case, the camera 90 has a field of view 92 extending rearward through the interior 40 over a large percentage thereof, e.g., the space between the doors 36, 38 and from the windshield 50 to the rear window 56. The camera 90 produces signals indicative of the images taken and sends the signals to a controller 100. The controller 100, in turn, processes the signals for future use.

Figure 2A:
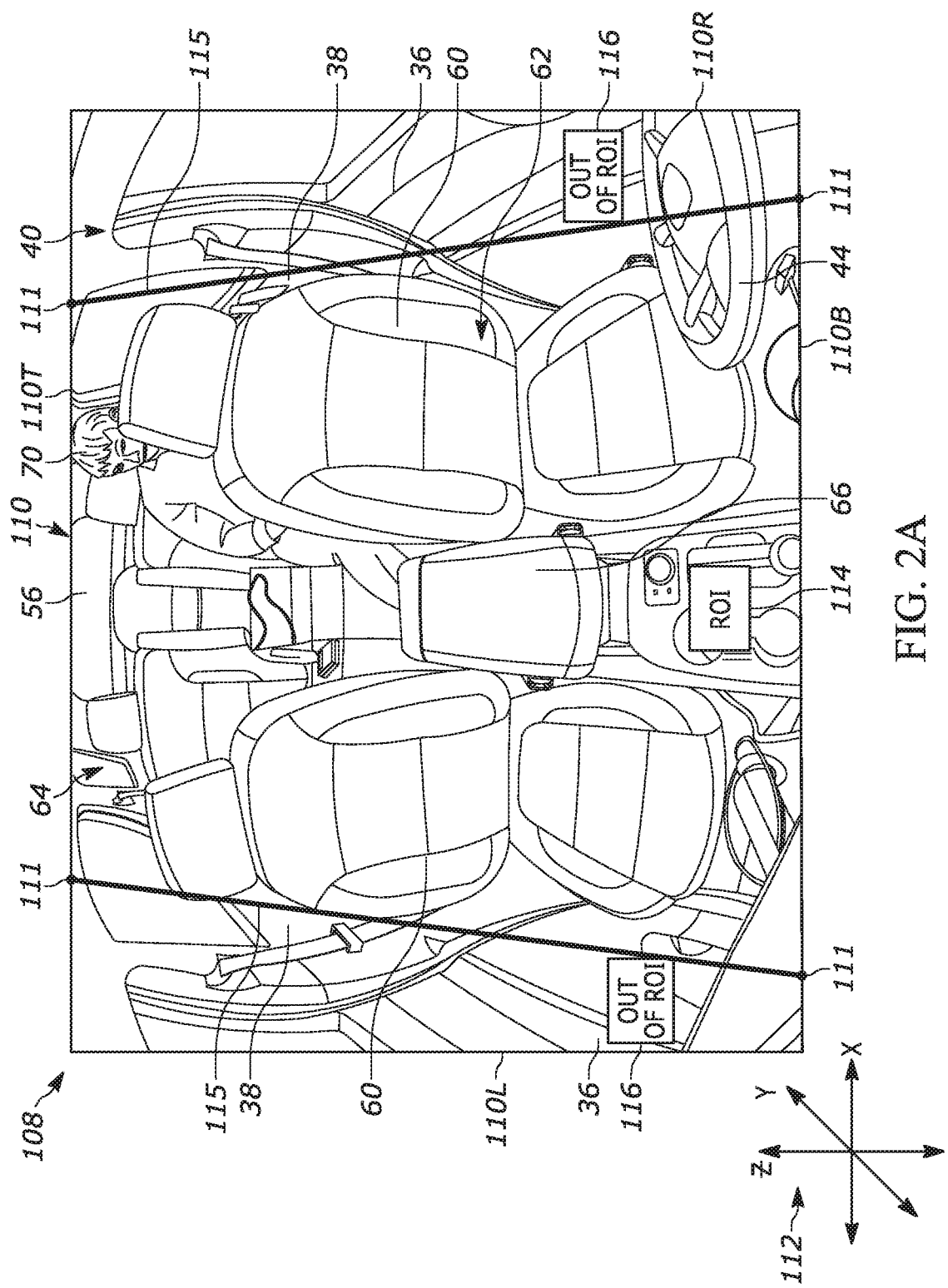
FIG. 2A is a schematic illustration of an ideally aligned image of the vehicle interior.

As shown in FIG. 2A, when the vehicle 20 is manufactured, a template or ideally aligned image 108 of the interior 40 is created for helping calibrate the camera 90 once the camera is installed and periodically thereafter. The ideally aligned image 108 reflects an ideal position of the camera 90 aligned with the interior 40 in a prescribed manner to produce a desired field of view 92. To this end, for each make and model of vehicle 20, the camera 90 is positioned such that its live images, i.e., images taken during vehicle use, most closely match the ideally aligned, desired orientation in the interior 40 including a desired location, depth, and boundary. The ideally aligned image 108 captures portions of the interior 40 where it is desirable to monitor/detect objects, e.g., seats 60, occupants 70, pets or personal effects, during operation of the vehicle 20.

The ideally aligned image 108 is defined by a boundary 110. The boundary 110 has a top boundary 110T, a bottom boundary 110B, and a pair of side boundaries 110L, 110R. That said, the boundary 110 shown is rectangular although other shapes for the boundary, e.g., triangular, circular, etc. are contemplated. Since the camera 90 faces rearward in the vehicle 20, the side boundary 110L is on the left side of the image 108 but the right side 30 of the vehicle 20. Similarly, the side boundary 110R on the right side of the image 108 is on the left side 28 of the vehicle 20. The ideally aligned image 108 is overlaid with a global coordinate system 112 having x-, y-, and z-axes.

The controller 100 can divide the ideally aligned image 108 into one or more regions of interest 114 (abbreviated "ROI" in the figures) and/or one or more regions of disinterest 116 (indicated at "out of ROI" in the figures). In the example shown, boundary lines 115 demarcate the region of interest 114 in the middle from the regions of disinterest 116 on either side thereof. The boundary lines 115 extend between bounding points 111 that, in this example, intersect the boundary 110. The region of interest 114 lies between the boundaries 110T, 110B, 115. The left (as viewed in FIG. 2) region of disinterest 116 lies between the boundaries 110T, 110B, 110L, 115. The right region of disinterest 116 lies between the boundaries 110T, 110B, 110R, 115.

In the example shown in FIG. 2A, the region of interest 114 can be the area including the rows 62, 64 of seats 60. The region of interest 114 can coincide with areas of the interior 40 where it is logical that a particular object or objects would reside. For example, it is logical for occupants 70 to be positioned in the seats 60 in either row 62, 64 and, thus, the region of interest 114 shown extends generally to the lateral extent of the rows. In other words, the region of interest 114 shown is specifically sized and shaped for occupants 70—an occupant-specific region of interest as it were.

It will be appreciated that different objects of interest, e.g., pets, laptop, etc., can have a specifically sized and shaped region of interest that pre-defines where it is logical for that particular object to be located in the vehicle 20. These different regions of interest have predetermined, known locations within the ideally aligned image 108. The different regions of interest can overlap one another depending on the objects of interest associated with each region of interest.

Figure 2B:
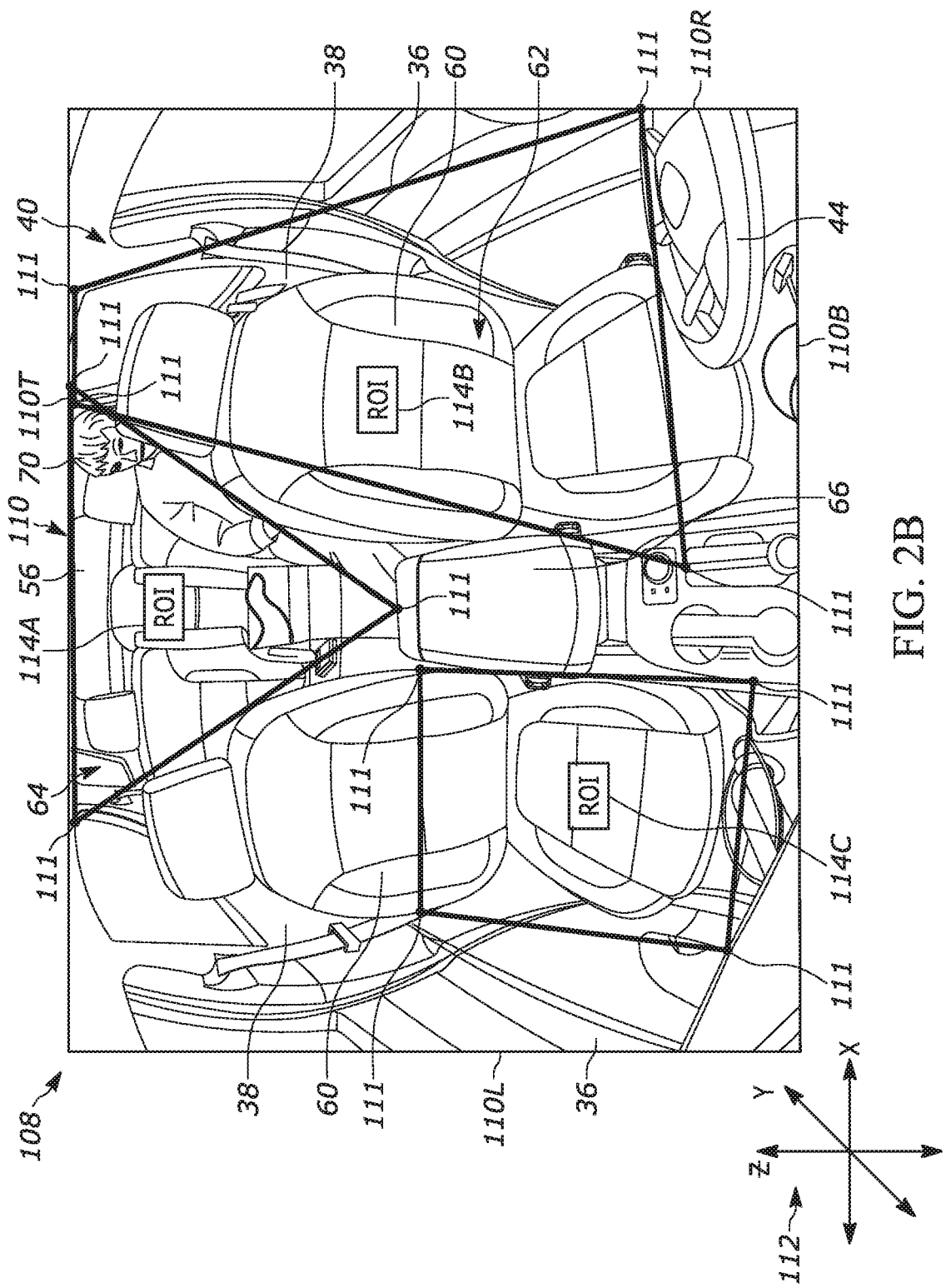
FIG. 2B is a schematic illustration of another example ideally aligned image.

With this in mind, FIG. 2B illustrates different regions of interest in the ideally aligned image 108 for different objects of interest, namely, the region of interest 114a is for a pet in the rear row 64, the region of interest 114b is for an occupant in the driver's seat 60, and the region of interest 114c is a for a laptop. Each region of interest 114a-114c is bound between associated bounding points 111. In each case, the region of interest 114-114c is the inverse of the region(s) of disinterest 116 such that collectively the regions form the entire ideally aligned image 108. In other words, everywhere in the ideally aligned image 108 not bound by the region of interest 114-114c is considered the region(s) of disinterest 116.

Returning to the example shown in FIG. 2A, the regions of disinterest 116 are the areas laterally outside the rows 62, 64 and adjacent the doors 36, 38. The regions of disinterest 116 coincide with areas of the interior 40 where it is illogical for the objects (here occupants 70) to reside. For example, it is illogical that an occupant 70 would be positioned on the interior of the roof 32.

Figure 3:
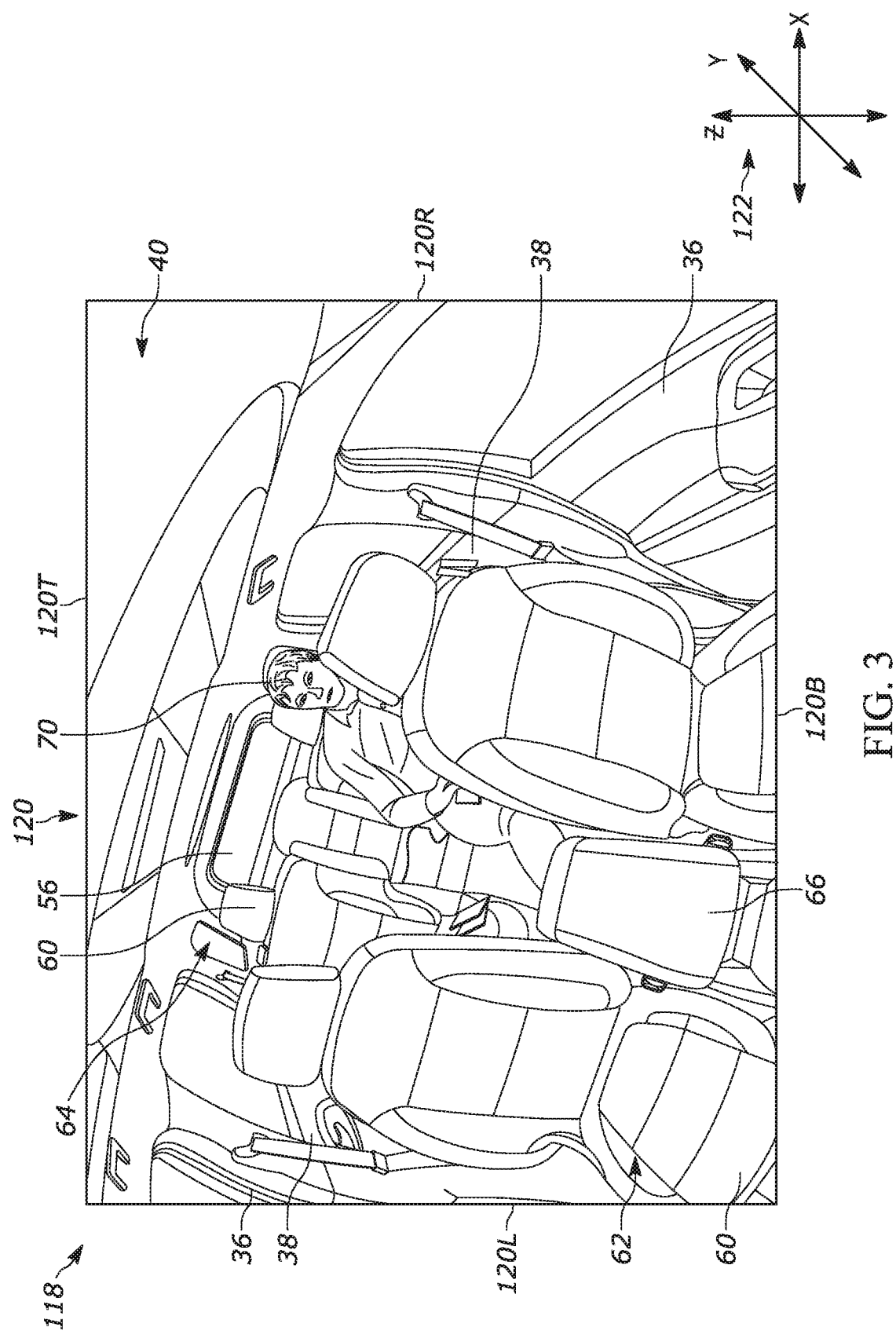
FIG. 3 is a schematic illustration of a live image of the vehicle interior.

During vehicle 20 operation, the camera 90 acquires images of the interior 40 and sends signals to the controller 100 indicative of the images. The controller 100, in response to the received signals, performs one or more operations to the image and then detects objects of interest in the interior 40. The images taken during vehicle 20 operation are referred to herein as "live images". An example live image 118 taken is shown in FIG. 3.

The live image 118 shown is defined by a boundary 120. The boundary 120 includes a top boundary 120T, a bottom boundary 120B, and a pair of side boundaries 120L, 120R. Since the camera 90 faces rearward in the vehicle 20, the side boundary 120L is on the left side of the live image 118 but the right side 30 of the vehicle 20. Similarly, the side boundary 120R on the right side of the live image 118 is on the left side 28 of the vehicle 20.

The live image 118 is overlaid or associated with a local coordinate system 122 having x-, y-, and z-axes from the perspective of the camera 90. That said, the live image 118 may indicate a deviation in position/orientation in the camera 90 compared to the position/orientation of the camera that generated the ideally aligned image 108 for several reasons. First, the camera 90 can be installed improperly or otherwise in an orientation that captures a field of view 92 deviating from the field of view generated by the camera taking the ideally aligned image 108. Second, the camera 90 position can be affected after installation due to vibration from, for example, road conditions and/or impacts to the rear view mirror 52. In any case, the coordinate systems 112, 122 may not be identical and, thus, it is desirable to calibrate the camera 90 to account for any differences in orientation between the position of the camera capturing the live images 118 and the ideal position of the camera capturing the ideally aligned image 108.

In one example, the controller 100 uses one or more image matching techniques, such as Oriented FAST and rotated BRIEF (ORB) feature detection, to generate keypoints in each image 108, 118. The controller 100 then generates a homography matrix from matching keypoint pairs and uses that homography matrix, along with known intrinsic camera 90 properties, to identify camera position/orientation deviations across eight degrees of freedom to help the controller 100 calibrate the camera. This allows the vision system to ultimately better detect objects within the live images 118 and make decisions in response thereto.

Figure 4:
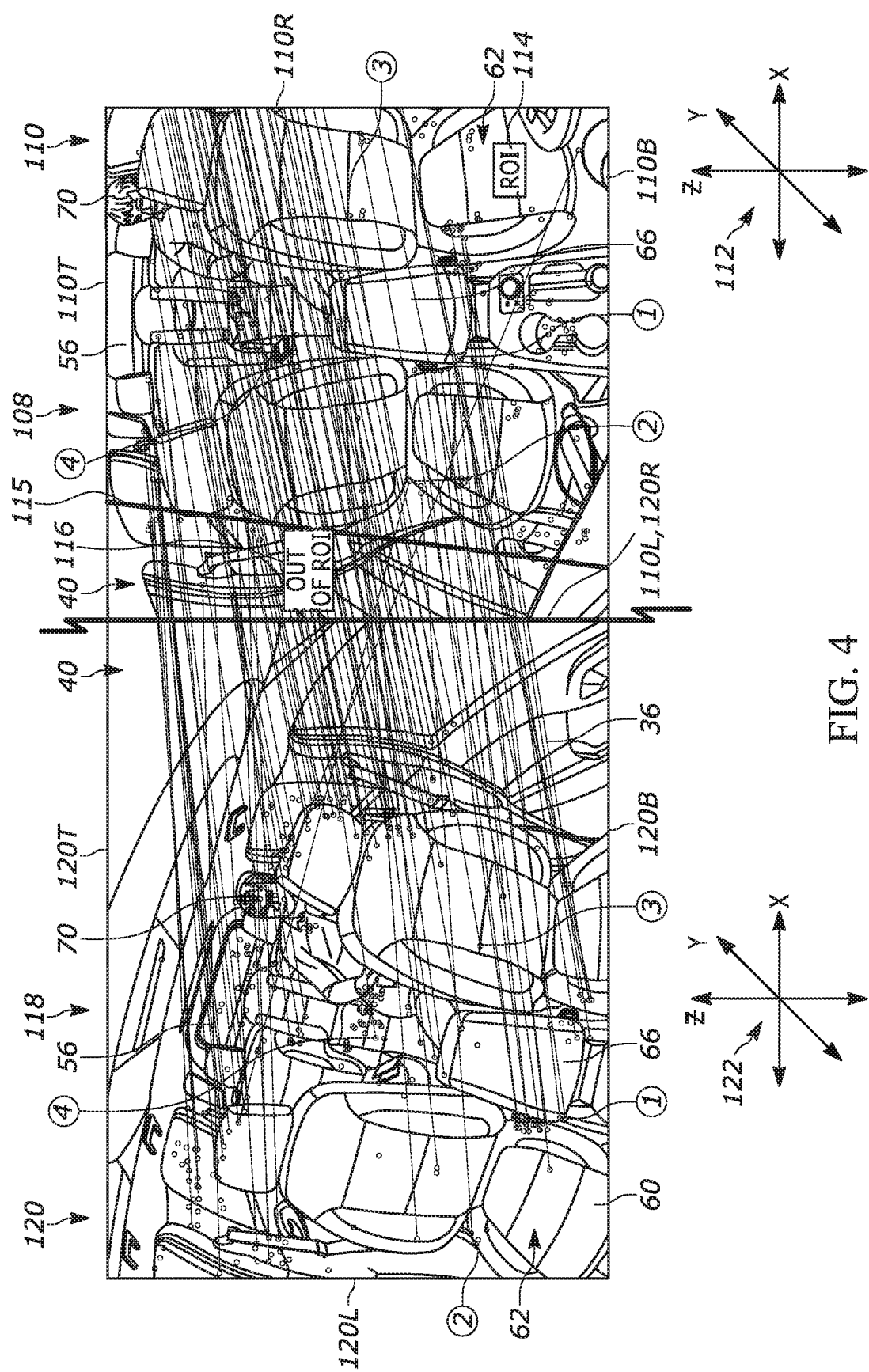
FIG. 4 is a comparison between the ideally aligned image and live image using generated keypoints.

One example implementation of this process is illustrated in FIG. 4. The ideally aligned image 108 and the live image 118 are placed adjacent one another for illustrative purposes. The controller 100 identifies keypoints—illustrated keypoints are indicated as ①, ②, ③, ④—within each image 108, 118. The keypoints are distinct locations in the images 108, 118 that are attempted to be matched with one another and correspond with the same exact point/location/spot in each image. The features can be, for example, corners, stitch lines, etc. Although only four keypoints are specifically identified it will be appreciated that the vision system 10 can rely on hundreds or thousands of keypoints.

In any case, the keypoints are identified and their locations mapped between image 108, 118. The controller 100 calculates the homography matrix based on the keypoint matches in the live image 118 against the ideally aligned image 108. With additional information of the intrinsic camera properties, the homography matrix is then decomposed to identify any translations (x, y, and z axis), rotations (yaw, pitch, and roll), and sheer and scale of the camera 90 capturing the live image 118 relative to the ideal camera capturing the ideally aligned image 108. The decomposition of the homography matrix therefore quantifies the misalignment between the camera 90 capturing the live image 118 and the ideal camera capturing the ideally aligned image 108 across eight degrees of freedom.

A misalignment threshold range can be associated with each degree of freedom. In one instance, the threshold range can be used to identify which live image 118 degree of freedom deviations are negligible and which are deemed large enough to warrant physical correction of the camera 90 position and/or orientation. In other words, deviations in one or more particular degrees of freedom between the images 108, 118 may be small enough to warrant being ignored—no correction of that degree of freedom occurs. The threshold range can be symmetric or asymmetric for each degree of freedom.

If, for example, the threshold range for rotation about the x-axis was +/−0.05°, a calculated x-axis rotation deviation in the live image 118 from the ideally aligned image 108 within the threshold range would not be taken into account in physically adjusting the camera 90. On the other hand, rotation deviations about the x-axis outside the corresponding threshold range would constitute a severe misalignment and require recalibration or physical repositioning of the camera 90. The threshold ranges therefore act as a pass/fail filter for deviations in each degree of freedom.

The homography matrix information can be stored in the controller 100 and used to calibrate any live image 118 taken by the camera 90, thereby allowing the vision system 10 to better react to said live images, e.g., better ascertain changes in the interior 40. To this end, the vision system 10 can use the homography matrix to transform the entire live image 118 and produce a calibrated or adjusted live image 119 shown in FIG. 5. When this occurs, the calibrated live image 119 can be rotated or skewed relative to the boundary 120 of the live image 118. The region of interest 114—via the bounding points 111—is then projected onto the calibrated live image 119. In other words, the un-calibrated region of interest 114 is projected onto the calibrated live image 119. This transformation of the live image 118, however, can involve extensive calculations by the controller 100.

Figure 6:
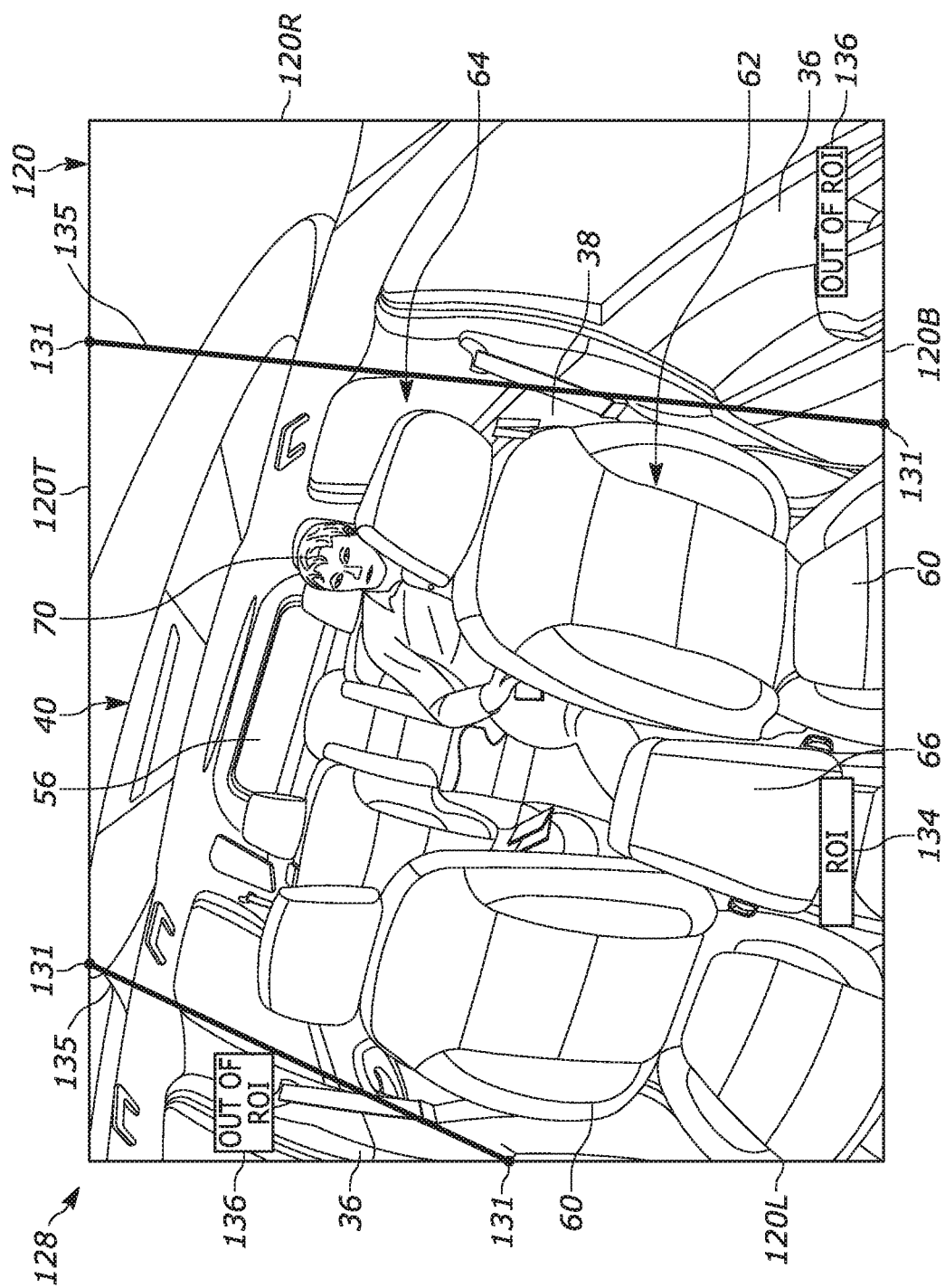
FIG. 6 is a schematic illustration of the live image with a calibrated region of interest.

That said, the controller 100 can alternatively transform or calibrate only the region of interest 114 and project the calibrated region of interest 134 onto the un-calibrated live image 118 to form a calibrated image 128 shown in FIG. 6. In other words, the region of interest 114 can be transformed via the translation, rotation, and/or sheer/scale data stored in the homography matrix and projected or mapped onto the untransformed live image 118 to form the calibrated image 128.

More specifically, the bounding points 111 of the region of interest 114 are calibrated with transformations using the generated homography matrix to produce corresponding bounding points 131 in the calibrated image 128. It will be appreciated, however, that one or more of the bounding points 131 could be located outside the boundary 120 when projected onto the live image 118, in which case the intersection of the lines connecting the bounding points with the boundary 120 help to define the calibrated region of interest 134 (not shown). Regardless, the newly calibrated region of interest 134 aligns on the live image 118 (in the calibrated image 128) as the original region of interest 114 aligns on the ideally aligned image 108. This calibration in effect fixes the region of interest 114 such that image transformations don't need to be applied to the entire live images 118, thereby reducing processing time and power required.

Figure 5:
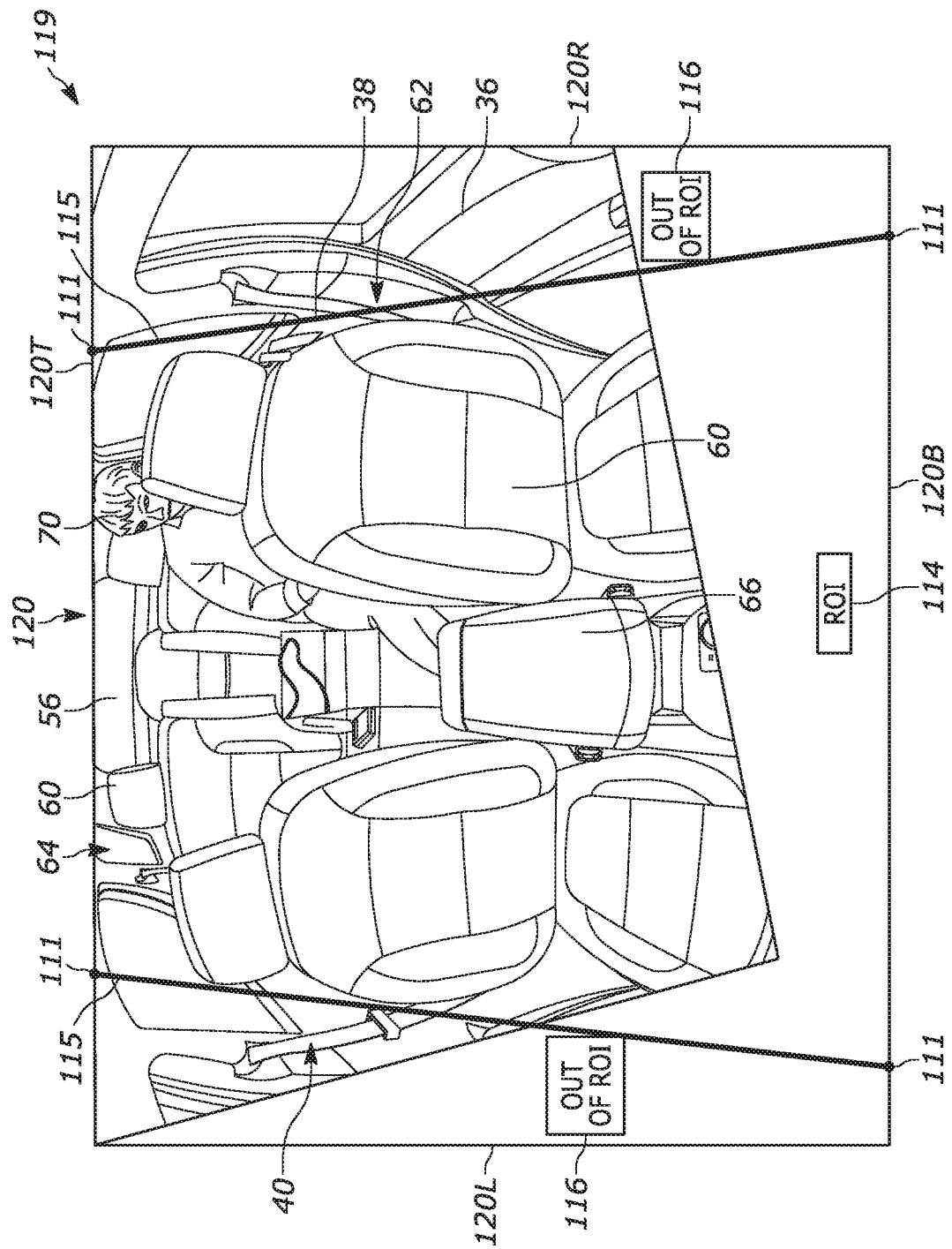
FIG. 5 is a schematic illustration of a calibrated live image with an ideally aligned region of interest.

To this end, calibrating the handful of bounding points 111 defining the region of interest 114 using the homography matrix is significantly easier, quicker, and more efficient than transforming or calibrating the entire live image 118 as was performed in FIG. 5. The region of interest 114 calibration ensures that any misalignment in the camera 90 from the ideal position will have minimal, if any, adverse effect on the accuracy in which the vision system 10 detects objects in the interior 40. The vision system 10 can perform the region of interest 114 calibration—each time generating a new homography matrix based on a new live image—at predetermined time intervals or occurrences, e.g., startup of the vehicle 20 or at five second intervals.

The calibrated region of interest 134 can be used to detect objects within the interior 40. The controller 100 analyzes the calibrated image 128 or calibrated region of interest 134 and determines what, if any, objects are located therein. In the example shown, the controller 100 detects occupants 70 within the calibrated region of interest 134. It will be appreciated, however, that the controller 100 can calibrate any alternative or additional regions of interest 114a-114c to form the associated calibrated region of interest and detect the particular object of interest therein (not shown).

The controller 100, when analyzing the calibrated image 128, may detect objects that intersect or cross outside the calibrated region of interest 134 and are therefore present both inside and out of the calibrated region of interest. When this occurs, the controller 100 can rely on a threshold percentage that determines whether the detected object is ignored. More specifically, the controller 100 can acknowledge or "pass" a detected object having at least, for example, 75% overlap with the calibrated region of interest 134. Consequently, a detected object having less than the threshold percentage overlap with the calibrated region of interest 134 will be ignored or "fail". Only detected objects that meet this criterion would be taken into consideration for further processing or action.

The vision system 10 can perform one or more operations in response to detecting and/or identifying objects within the calibrated image 128. This can include, but is not limited to, deploying one or more airbags based on where occupant(s) are located in the interior 40 or alerting the driver when a pet or child is not in a normal position in the rear row 64 of seats 60, etc.

The vision system shown and described herein is advantageous in that it helps to reduce false positives and false negatives in object detection. In many current vision systems, the system identifies what it believes to be an object, but human inspection reveals a false positive indication. For example, a current vision system may detect an object that is no there and/or detect on object in locations that are nonsensical, e.g., a laptop or cell phone on the roof of the vehicle. The vision system described herein, however, reduces the likelihood of false positives by calibrating the regions of interest and reducing the evaluation to locations in the image where only logical objects can be found.

Moreover, by aligning or adjusting the live image to the ideally aligned image, the vision system of the present invention helps to ensure that the location data of the objects detected is accurate so that more educated decisions can be made regarding object detections and their viability.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method of adjusting a camera within a vehicle interior, comprising:
   acquiring a live image of the vehicle interior;
   comparing the live image to a template image of the vehicle interior to generate a homography matrix;
   determining differences between the live image and the template image in at least one degree of freedom from the homography matrix; and
   adjusting at least one of a position and orientation of the camera based on the at least one degree of freedom difference.

2. The method of claim 1, wherein the at least one degree of freedom difference comprises translation of the live image relative to the template image.

3. The method of claim 1, wherein the at least one degree of freedom difference comprises rotation of the live image relative to the template image.

4. The method of claim 1, wherein the step of comparing the live image to the template image comprises image matching the live image to the template image.

5. The method of claim 1, wherein each of the at least one degree of freedom differences has a threshold range associated therewith, wherein the least one of a position and orientation of the camera is adjusted only when the degree of freedom difference is outside the associated threshold range.

6. The method of claim 1, wherein the camera has a fixed position in the vehicle and the homography matrix reflects misalignment of the camera between taking the template image and the live image.

* * * * *